US007443304B2

(12) United States Patent
Rowe et al.

(10) Patent No.: US 7,443,304 B2
(45) Date of Patent: Oct. 28, 2008

(54) METHOD AND SYSTEM FOR MONITORING A PATIENT IN A PREMISES

(75) Inventors: Meredeth A Rowe, Gainsville, FL (US); Gordon G Hope, Miller Place, NY (US); Christopher D Martin, Plainview, NY (US); Victor Pascual, Stony Brook, NY (US); David S Zakrewski, Babylon, NY (US); Hong-Jyh Chen, Woodbury, NY (US)

(73) Assignee: Honeywell International Inc., Morristown, NJ (US)

( * ) Notice: Subject to any disclaimer, the term of this patent is extended or adjusted under 35 U.S.C. 154(b) by 91 days.

(21) Appl. No.: 11/636,352

(22) Filed: Dec. 8, 2006

(65) Prior Publication Data

US 2007/0132558 A1 Jun. 14, 2007

Related U.S. Application Data

(60) Provisional application No. 60/748,990, filed on Dec. 9, 2005.

(51) Int. Cl.
*G08B 13/00* (2006.01)
*G08B 23/00* (2006.01)
*G09B 21/00* (2006.01)

(52) U.S. Cl. ................. 340/573.1; 340/573.4; 340/550; 340/825.19

(58) Field of Classification Search ................. 340/506, 340/507, 508, 509, 510, 511, 512, 513, 426.15, 340/539.14, 539.16, 539.17, 539.18, 539.19, 340/539.2, 541, 550–561, 573.4, 825.19, 340/286.07, 573.1; 455/404.1, 404.2, 507, 455/521; 600/534
See application file for complete search history.

(56) References Cited

U.S. PATENT DOCUMENTS

| | | | |
|---|---|---|---|
| 5,600,305 | A | 2/1997 | Stafford et al. |
| 5,905,436 | A | 5/1999 | Dwight et al. |
| 6,930,608 | B2 | 8/2005 | Grajales et al. |
| 2004/0082974 | A1 | 4/2004 | Aoki et al. |
| 2005/0099294 | A1 | 5/2005 | Bogner et al. |
| 2006/0033625 | A1 | 2/2006 | Johnson et al. |

*Primary Examiner*—George A Bugg
*Assistant Examiner*—Jennifer Mehmood
(74) *Attorney, Agent, or Firm*—Anthony R. Barkume

(57) ABSTRACT

A system and method for monitoring the whereabouts of a patient in a house using security system components such as motion detectors and the like, and for providing automated lighting sequences to strategically located light fixtures for use as an aide in the patient walking around the house unattended.

32 Claims, 4 Drawing Sheets

METHOD AND SYSTEM FOR MONITORING A PATIENT IN A PREMISES

CROSS-REFERENCE TO RELATED APPLICATION

This application claims filing priority from co-pending provisional application Ser. No. 60/748,990, filed on Dec. 9, 2005.

TECHNICAL FIELD

This invention relates to security systems, and in particular to a security system and method of operation that enables a caregiver to monitor the whereabouts and activities of a patient in his or her care.

BACKGROUND ART

Dementia illnesses, including but not limited to Alzheimer's disease, are on the rise in this country. Estimates are that there are currently over four million people suffering to varying degrees from this illness. It is also estimated that 70% of the total market could benefit from pre-institutional care. There will be significant growth trends in this market over the next 10 to 30 years.

The burden placed on family members or spouses to deal with dementia patients within their home is substantial and disruptive to traditional life styles. The burden falls on the in-home caregiver (e.g. a spouse or adult child who has taken on the responsibility to care for this person) to deal with the illness while dealing with everyday life.

A caregiver has fundamental needs including the monitoring of the patient's whereabouts within the protected premises, notification at different alarm levels when moving about the home, and the ability to get more restful sleep since they carry the burden of normal work and family responsibilities in addition to the needs of the dementia patient.

The security industry has an opportunity to be the provider of such a system. A key component of such a system is a clear understanding of the specific needs of the caregiver and how the dementia illnesses affect its victims and modifies their behavior. It has been determined that traditional off the shelf security systems are not adequate for on-site monitoring flexibility needed by the caregiver. No systems are currently available that would provide in-home monitoring and notification for these types of patients. Proper system architecture and attention to details based on existing security system hardware and firmware can be developed into a system that will meet these needs.

One primary purpose of the present invention is to provide a solution that monitors the motion of a patient to prevent injury to him or her while also assisting the caregiver in getting a better night's sleep. In addition, it is desired to be able to provide some automated assistance to the patient to help him or her navigate throughout the house at night, unassisted, such as by sequencing lights on and off throughout the house.

DISCLOSURE OF THE INVENTION

Thus, the present invention is a method and system for monitoring a patient located in a premises such as a house or other residential building. The system includes a first plurality of motion detectors that are strategically located in a first area under surveillance in the premises such as the patient's bedroom. The first area under surveillance is monitored with the first plurality of motion detectors to ascertain if the patient has moved from an in-bed position, and a notification is provided to the caregiver if it is determined that the patient has moved from the in-bed position.

Signals are collected from each of the first plurality of motion detectors, and they are analyzed to determine if the signals match a first predetermined pattern indicative of movement from the in-bed position.

When the first area under surveillance is a bedroom, then the first plurality of motion detectors are strategically located by locating a first motion detector on a first wall at approximately the same height as a top surface of the bed, locating a second motion detector approximately one foot above the floor along a side of the bed the patient normally leaves from, and locating a third motion detector near the door.

The first predetermined pattern includes that when the second motion detector is not activated and the third motion detector is not activated, it is determined that the patient has not moved from the in-bed position. Further, when the second motion detector is activated, the first motion detector is not activated for approximately five seconds after the second motion detector is activated, and the third motion detector is not activated, it is determined that the patient has moved from the in-bed position.

It may also be determined if a patient has left the first area under surveillance by analyzing the signals from each of the motion detectors to see if they match a second predetermined pattern indicative of leaving the first area under surveillance (for example when the third motion detector is activated, it is determined that the patient has left the bedroom).

This invention also can determine if the patient has returned to the bed by collecting signals from each of the first plurality of motion detectors and determining if the signals from each of the first plurality of motion detectors match a third predetermined pattern indicative of movement to the in-bed position. For example, the third predetermined pattern includes when the third motion detector is activated and the first motion detector or the second motion detector is activated within approximately twenty seconds of the third motion detector being activated, it is determined that the patient is returning to the bedroom. Furthermore, when the second motion detector is activated and then deactivated, and the first motion detector is activated for approximately five seconds after the second motion detector is deactivated, and the third motion detector is not activated, it is determined that the patient has returned to the bed.

The system may also include a door closure sensor proximate the first area under surveillance to ascertain if the patient has left the first area under surveillance.

The caregiver may be provided with notification after the system determines the patient has moved about the premises as described above, for example he or she may be provided the ascertained location of the patient by displaying the location of the patient on a console, or an alarm may be sounded, or the location of the patient may be spoken through a speaker.

The system also may include a second plurality of motion detectors strategically located in a second area of surveillance proximate the first area under surveillance; in this case a direction of movement by the patient by is ascertained by determining if the signals from each of the second plurality of motion detectors match a fourth predetermined pattern indicative of movement in the second area under surveillance.

The system may also include a plurality of light fixtures strategically located throughout the premises that are selectively enabled and disabled in accordance with a predetermined lighting sequence, which aides the patient in navigating his or her way around the premises without disturbing others.

In addition, in order to filter out false alarms (situations where someone besides the patient may be triggering the hallway sensors), the second plurality of motion sensors (in the hallway) maybe monitored only when it has been determined that the patient has left the first area under surveillance (the bedroom).

In another aspect, a bed sensor may be located with respect to a bed in the first area under surveillance and monitored to help ascertain if the patient has moved from the in-bed position.

BEST MODE FOR CARRYING OUT THE INVENTION

Figure 1:
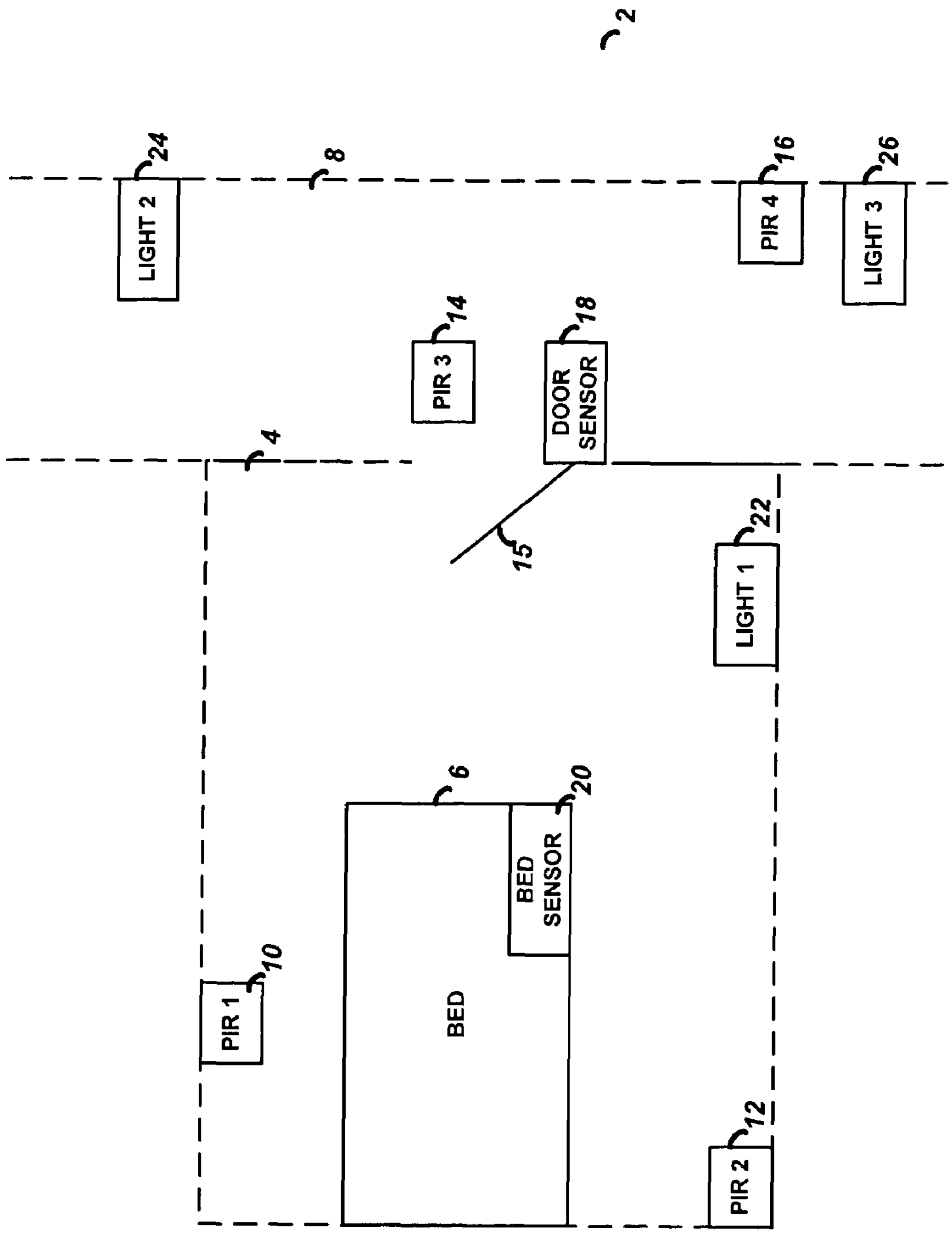
FIG. 1 is a block diagram of the layout of the security devices used in the present invention.

The best way to explain how the present invention operates is to first describe its operation in a typical environment. Provided is a description of a home, its rooms and the patient followed by examples of system operation.

The home is a traditional two-story home with living quarters and several bathrooms upstairs while the downstairs contains the traditional living quarters and kitchen. The system of the present invention contains both elements for the security of the home as well as the dementia patient tracking elements installed. These two systems, although together in the one expression truly act separately. Thus the burglary aspects can be controlled independently of whether or not the system is set for dementia patient tracking.

Another element of the present invention is how it operates in adverse conditions, such as when AC power is not available or when the phone lines are not working. The system therefore has stand-by battery operation at all times and provides for alternate communications to people outside of the protected premise in the event that the phone lines become non-operational. For example, the ADEMCO AlarmNet-C (AlarmNet GSM) radio system, designated as the 7845C, (7845IGSM, 7845GSM) is an ideal addition to the system for providing this backup communications capability.

The security portion consists of the typical elements installed for protection of the premises and the occupants. The upstairs hallway contains a motion sensor along with door/window contacts on all windows. This protects entrance by a burglar into the home on the second floor. It also will sense an intruder that enters from the downstairs and is going up to the second floor.

Downstairs, the front door and back door contain contacts and a motion sensor is also placed within the home to sense motion into the kitchen area. All windows on the first floor are protected with contacts.

The dementia patient monitoring elements are then added onto the system. Here, we look to provide the types of sensors, which will accurately track the patient in areas throughout the house. In the bedroom where the dementia patient will sleep will be installed at a minimum a motion sensor or motion sensors that will tell when the patient is out of the bed and wandering within the bedroom. A motion sensor must be placed immediately outside the bedroom door to catch the dementia patient when leaving the bedroom and indicating his/her presence in the hallway. Further motion sensors must be placed to track the patient and signal entrance into another area of the house. For instance, if the patient goes downstairs from the hallway, a motion sensor might be placed at the bottom of the stairs to indicate the patient is now on the first floor.

The monitoring aspects will implement a voice-enabled keypad, which adds a very important element of notification to the caregiver. These keypads will be the voice for the burglary and traditional alarm messages as well as the messages required for patient tracking information. Note that the number of protection devices is not limited to this example. Additional motion sensors can and may be added depending upon the specific environment.

The addition of lighting control can be added on top of these capabilities by simply upgrading to a transformer that provides both power and a built-in X-10 interface. Then simple light or appliance modules are added in the desired rooms and lights plugged into them. At this point the system is capable of providing a basic level of lighting that tracks the patient within the protected premises.

Figure 2:
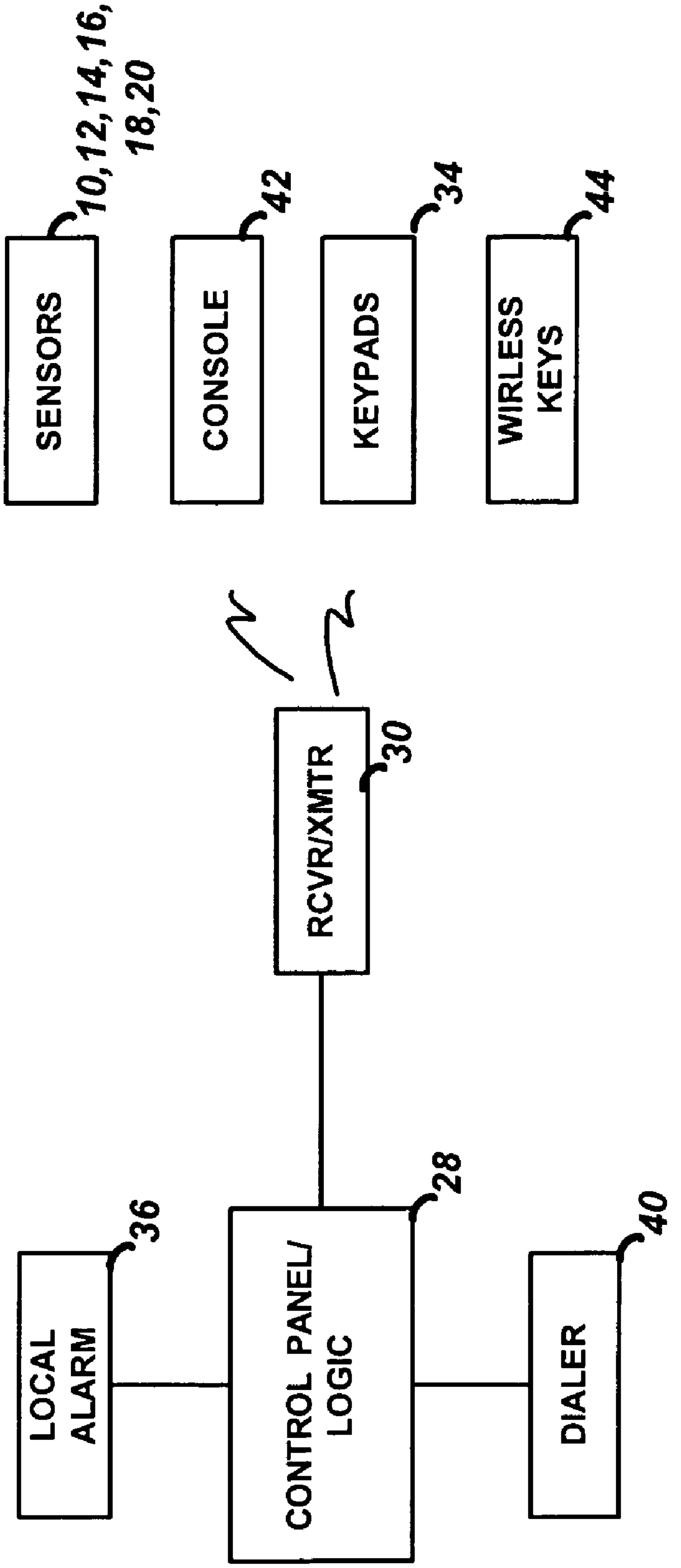
FIG. 2 is a block diagram implementation of the control panel.

The preferred embodiments of the present invention will now be described with respect to the Figures. FIGS. 1 and 2 illustrates a basic block diagram of the system 2 of the present invention. In this embodiment, a first area under surveillance is the patient's bedroom 4, which is adjoined by a hallway 8 (the second area under surveillance). The principles of this invention may be extended to numerous other areas under surveillance such as a living room, kitchen, den, other hallways, bathrooms, etc.

In this embodiment, a plurality of motion detectors are strategically located throughout the bedroom as is further described in order to intelligently determine if the patient has left the bed, left the bedroom, which way he is traveling in the hallway, whether he has returned to the bedroom and/or bed, etc. The motion detectors must be placed in certain locations as defined by this invention, and the signals analyzed in accordance with certain predetermined patterns, to ascertain these conditions. That is, the system is intelligent in being able to filter out a simple in-bed movement (e.g. tossing and turning) from the aforementioned conditions that require a more sophisticated approach under this invention.

The motion detectors 10, 12, 14 and 16 shown in FIG. 1 are passive infrared detectors (PIRs) as well known in the art. These devices may if desired be active types such as microwave detectors (or dual tech devices employing active and passive technologies), as desired by the system designer. In addition, the motion detectors used in this embodiment utilize wireless transmission of signals to receiver/transmitter 30 to communicate with the control panel 28 (or other logic analysis device). In the alternative, wired bus systems may be used as well known in the art. Wireless devices are preferred since they allow for ease of installation, and they also allow for simple re-location such as for system fine-tuning, bed relocation, etc.

In addition to the motion detectors that operate in conjunction with logic analysis to be described herein, the patient's movement and whereabouts may also be determined using, alone or in conjunction with the motion detectors, a bed sensor 20 and/or a door sensor 18. The bed sensor 20 may be a device adapted to determine if the patient has left the bed 6, such as if a mattress compresses or decompresses a certain amount. Sensing this mattress compression and/or decompression will enable the logical analysis to proceed as further described. In the case of the door sensor 18, different types of devices exist on the market that enable the system to ascertain if the door is closed or open. For example, a contact closure switch may be placed in association with the door 15 and door jamb that will send signals indicative of the position of the door as well known in the art.

Also shown in the system of FIG. 1 are light 22 in the bedroom 4, and lights 24, 26 in the hallway 8. These lights may be controlled by the control panel 28, and are shown here as wireless devices controlled via the transmitter 30 (although again a wired bus system may be used if desired). Likewise, a control technology such as X10 may be used to turn the lights on and off as desired by the system. The lights may also be controlled locally such as by an on/off switch, not shown. In any event, the lights are controlled by logic in the control panel that may sequence them and thus guide the patient automatically if he or she should stray from his bedroom unattended in the middle of the night or otherwise without requiring attention from the caregiver who may be sleeping.

Thus, the system of the present invention includes specially located sensor input devices in the form of motion detectors, bed sensor(s), and door sensor(s). Other input devices that may operate to provide pertinent information to the control panel may also be used within the scope of the present invention.

FIG. 2 also shows the remaining devices in the system 2, including the control panel 28, which has an associated wireless receiver/transmitter 30. A local alarm 36 is connected to the control panel and functions to emit a loud siren in an emergency condition, such as a security breach (as known in the prior art) or if it is determined that the patient has wandered outside an allowed region (such as outside the building). A dialer 40 is also shown, which as known in the prior art is programmed to dial an outside location such as a central station monitor for reasons similar to the local alarm 36 being sounded. Likewise, console(s) 42 may be strategically located throughout the building as known in the art for allowing control of the system as well as obtaining system status and feedback through an associated display (such as "PATIENT OUT OF BED") (consoles may be hardwired or wireless). A keypad 34 may be also used for control without having feedback or other display capabilities if desired. These devices are generally known in the art of security systems and may be adapted as further described herein. Wireless keys 44 may also be used to control the system as known in the art.

In order to carry out the functions of the present invention, the control panel 28 is programmed with logic functions as will be described. This logic and functionality may be located on another device other than the control panel although adapting a prior art control panel is the preferred embodiment. The control panel is programmed to look for matches of signal patterns received from the motion detectors 10, 12, 14, 16 as described.

Figure 3:
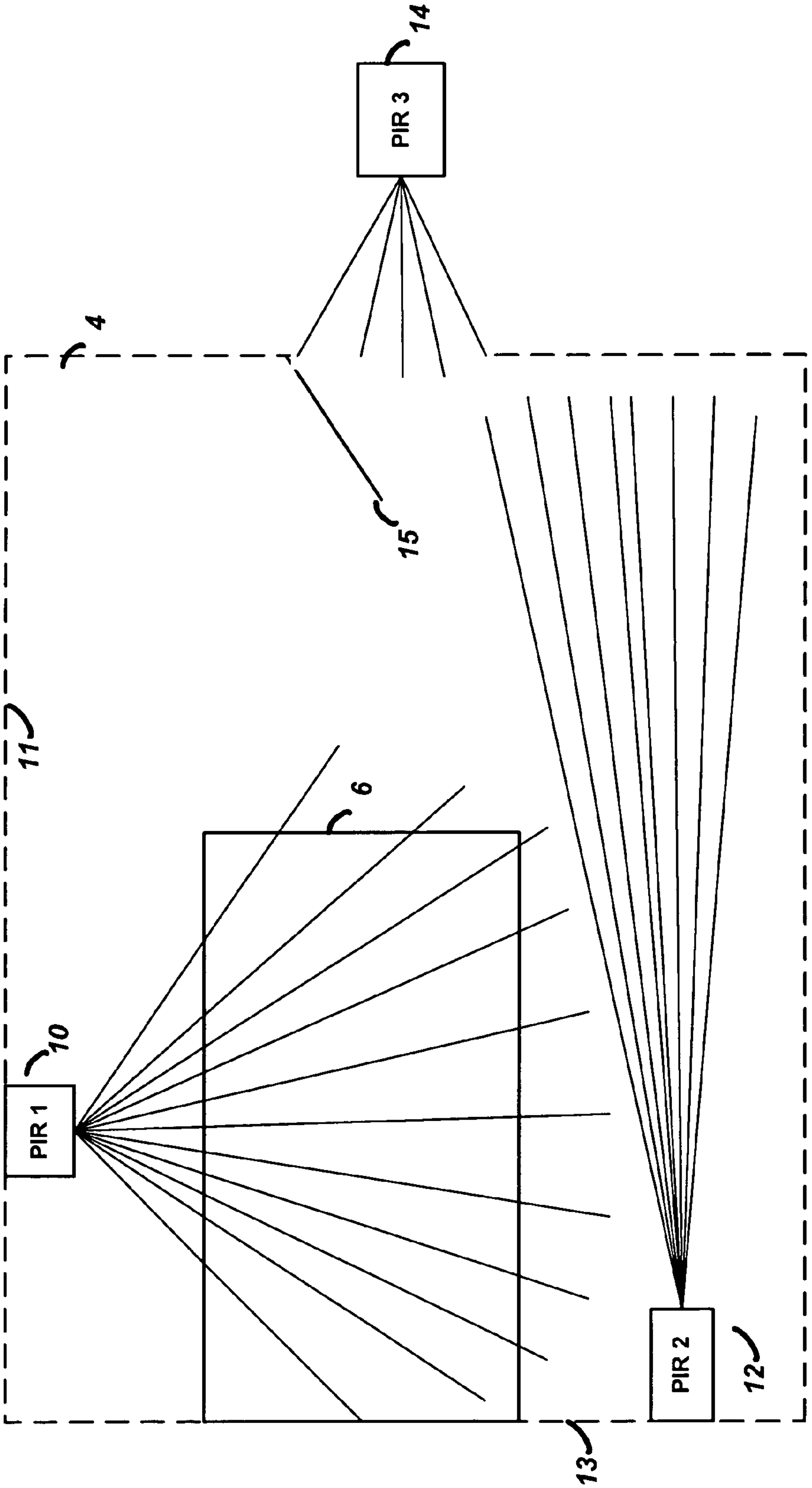
FIG. 3 is a detailed diagram of a bedroom configured for this invention.

The locations of the motion detectors are an important part of this invention since the intelligent analysis by the control panel will rely on this information in performing its analysis. FIG. 3 illustrates an example of the motion detector locations in a bedroom and their zones of coverage. In FIG. 3, the bed 6 is in a central location of the room 4. The first motion detector 10 is located on a wall 11 at approximately the same height as the top surface of the bed 6. The second motion detector 12 is located on a wall 13 approximately one foot above the floor along a side of the bed 6 that the patient will normally leave from. A third motion detector 14 is in this example located near the door 15 just outside the bedroom.

The location of the first motion detector 10 will enable it to cover the general surface area of the bed as shown, while the location of the second motion detector will enable it to cover the region where the patient would be expected to be walking as he enters or leaves the bed itself as shown. The location of the third motion detector covers the door region as shown. By using the intelligence programmed into the control panel 28, tracking of the patient will be accomplished accordingly.

In the preferred embodiment, the control panel 28 looks for a predetermined sequence of signals from the motion detectors 10, 12, 14 to determine if the patient has left the bed and then left the bedroom. Once the patient has been placed in the bed at night, a code is input to a keypad 34 to indicate the In Bed condition as will be described further below. From then on, the control panel monitors the input signals from the motion detectors 10, 12, 14 and looks for matching of a first predetermined pattern as follows.

When the second and third motion detectors 12, 14 are not activated, then the control panel continues monitoring the signals and concludes that the patient is still in the bed. In this case any movement by the patient that may be sensed by the first motion detector 10 (which monitors the top surface of the bed) will be ignored since he has not left the bed. However, when the second motion detector 12 has been activated, then the control panel logic looks to see if the first motion detector 10 is quiet (not activated) for a period of approximately five seconds. If this condition is met, and there is no activity detected by the third motion detector 14, then the control panel logic concludes that the patient has gotten out of bed but has not left the bedroom. This out-of-bed condition may then be communicated to the caregiver if the control panel is programmed to do so. For instance, the system may be programmed to allow the patient to get out of bed as long as he stays in the room, without alerting the caregiver. In the case of a more strict security setting, it may be desired to alert the caregiver that the patient has left the bed, such as with a higher risk patient. In this case, the control panel 28 may be programmed send out a signal to a display console 42, to emit a local alarm 36, or both. The display may be programmed to read "PATIENT OUT OF BED" or the like. In addition, a voice synthesis device may be used to speak this alert through a speaker if desired. The caregiver may then act as desired, for instance by visiting the bedroom to check on the patient, reset the system, etc.

If the patient does not return to the bed (determined as described below), then the control panel will be able to ascertain if the patient has left the bedroom by continuing to process the information from the system components and look for a second predetermined pattern of events. In this example, if the third motion detector 14 is activated after the out-of-bed condition has been sensed, then the control panel determines that the patient has left the bedroom. In addition or in the alternative to the third motion detector 14, a door closure sensor 18 as shown in FIG. 1 may be utilized to determine if the door has been open or closed. If this occurs, a signal will be sent from the door closure sensor 18 to the control panel, and the control panel logic will assume that this is an indicator of the patient leaving the room. Door closure sensors are well known in the art, and may be mechanical switches, magnetic reed switches, and the like.

As an additional embodiment to the motion detector pattern matching just described, the present invention may also use a bed sensor 20 as shown in FIG. 1 to ascertain if the patient has left the bed (or returned to it). A sensor that can determine increase or decrease of pressure may be adapted to determine if the mattress is compressed or decompressed, and thus if the patient has left the bed or returned to the bed accordingly.

Once the system has determined that the patient has left the bed and/or bedroom, it will continue to monitor the signals from the plurality of motion detectors to determine if the patient has returned to the bed by determining if the signals match a third predetermined pattern indicative of movement to the in-bed position. For example, the third predetermined pattern includes when the third motion detector is activated and the first motion detector or the second motion detector is activated within approximately twenty seconds of the third motion detector being activated, it is determined that the patient is returning to the bedroom.

Furthermore, when the second motion detector is activated and then deactivated, and the first motion detector is activated for approximately five seconds after the second motion detector is deactivated, and the third motion detector is not activated, it is determined that the patient has returned to the bed. This information may also be communicated to the caregiver through the various displays and speakers as described above.

Although the bed 6 is shown in the central location of the room in FIG. 3, it may be placed against the wall 11 if desired. This ensures that the patient will trigger the detector 12 if he gets out of (or into) the bed. In the alternative, another detector may be placed in wall 13 on the other side of the bed shown in FIG. 3 as well.

In another aspect of the invention, the system will selectively enable and disable lights throughout the premises as it determines the location of the patient. For example, if the control panel 28 ascertains that the patient has gotten out of bed as described above, then it may send an enable signal to light 22 in the bedroom to aide the patient in moving around the bedroom. Likewise, if the control panel 28 determines that the patient has left the bedroom and entered the hallway, it may send enable signals to the lights 24 and 26 in the hallway to light a path for the patient and aide his navigation. Once the patient is ascertained to have returned to bed the control panel may send disable signals to the lights 22, 24, 26 if desired. The light sequencing may be extended throughout the house in conjunction with additional motion detectors and door closure sensors (not shown for clarity).

In an alternative embodiment, image sensors and image recognition techniques may be used instead of or as a supplement to the motion detectors. For example, a series of CCD sensors or the like may be strategically located throughout the premises and connected (wired or wireless) to a computing device (embedded in the control panel or logically associated with it). Image information would be obtained from the image sensors and processed with face recognition techniques as known in the art. This would enable the system to distinguish amongst family members, so only the patient would be flagged and reported to the caregiver as described above. Each allowed family member would be enrolled in the system by imaging their faces and storing the recognition characteristics in an associated database.

As mentioned above, the preferred embodiment of the present invention utilizes several modes of operation, control and response that will now be described. As mentioned briefly above, there are several types of modes and zone response types that are programmed into the system. Two types of modes of operation are used; the Daytime Mode and the In Bed Mode. In addition, there are two types of response types that are used; the Monitor Zone type and the Response Zone type.

When the system operates in the Daytime mode, all people in the protected premises are monitored at all times. That is, the intent is to monitor not just the patient but all persons' movements as well. When the system operates in the In Bed mode, the system operation is focused on just the patient, and in particular will ascertain if he gets out of bed, moves into the hall, etc., as described above.

Operation under either of these modes will be further described below.

When the system is programmed to respond to Monitor Zone types, this will include only those monitoring devices (e.g. motion detectors) that are located in areas deemed to be non-dangerous (for example the patient's bedroom). The caregiver will be notified via the mechanisms described above in the patient enters a Monitor Zone. However, if an area is deemed to be dangerous to the patient (such as a bathroom), then it the sensors in that area will be assigned to be a Response Zone type. In addition to notification of the caregiver if the patient enters a Response Zone, caregiver response and acknowledgement will be required in order to stop sounding an alarm (such as by the caregiver entering a passcode into the system). That is, the audible alarm will retrigger unless reset by the caregiver in this situation. This may also be used at exit doors so the caregiver can be notified that the patient has left the premises.

Figure 4:
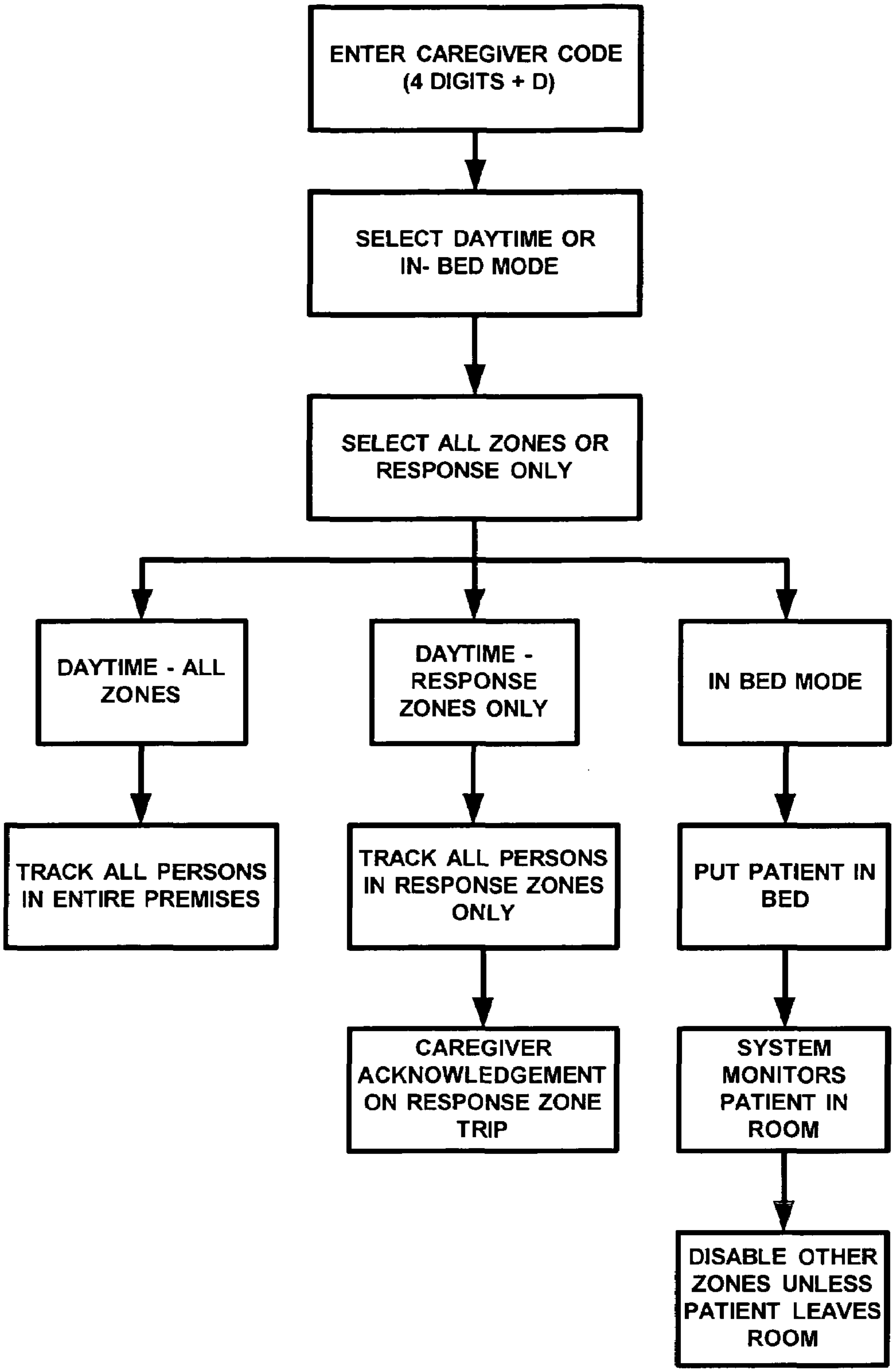
FIG. 4 is a flowchart of the operation of the present invention.

With reference to FIG. 4, the caregiver can put the system into a specific mode as desired by entering appropriate commands as herein described on a keypad or console, or by selecting a single button on an appropriately programmed wireless key. Also the system can be removed from monitor mode altogether with the press of a different button. For example, using a wall-mounted keypad, the caregiver enters his four-digit code followed by the "D" key (the key on the keypad at the lower left of the layout). The caregiver will now have a choice to select from one of the two different types of monitoring modes: the Daytime Mode or In Bed Mode.

If the caregiver simply wants to monitor the whereabouts of all people in the protected premises, including the patient, he would select option 1 on the keypad to indicate the Daytime Mode. In a more controlled environment, such as when the patient is going to sleep, the caregiver would insure that the patient is first in bed and then select option 2 for In Bed Mode. The behavior of the system is a bit different depending upon the mode selected as will be further described.

After selection of the Daytime or the In Bed Mode, the caregiver will select which zone types should be monitored. Depressing option 1 on the keypad means that the system will behave with appropriate responses for Monitor and Response Zone types, whereas selection of option 2 means that the system will only be monitoring those zone types programmed as Response Zone. Once this selection is made, the system is put into the appropriate mode of supervision.

Daytime Mode

In this mode, any person in the protected premise is tracked and the system will respond with audible messages for zones programmed with zone response types of either Monitor or Response. The system does not know where the dementia patient is located at the time of the system being set so therefore it will respond to all motion within the house for zones programmed as either Monitor or Response. If the caregiver has selected the Daytime—Monitor Mode with all zones enabled for monitoring, the following will be displayed on the console:

DAYTIME MONITOR MODE—ALL ZONES MONITORED

If the caregiver has chosen the option to allow only the Response zones to be annunciated and tracked, the following will be displayed.

DAYTIME MONITOR MODE—ONLY RESPONSE ZONES MONITORED

In Bed Mode

This is the mode likely to be used when the dementia patient is going to sleep and will therefore be in his/her room in a bed. In this scenario, the caregiver first lets the patient get into bed and then the caregiver sets the system in this mode. A suitable period of time is allowed (30 seconds to 1 minute) to facilitate the exit of the caregiver from the patient's room. In this mode, the patient is initially identified to the system as the one in the bed and will only track what it believes to be this person's movements throughout the house as described above. Depending upon whether all zones have been selected for monitoring or whether the caregiver has chosen to restrict the zones to only the Response type of zones, the display will be one of the following

IN BED MONITOR MODE—ALL ZONES MONITORED

IN BED MONITOR MODE—ONLY RESPONSE ZONES MONITORED

This method differs from the Daytime Mode in that the system will ignore all Monitor and Response type zones until the patient has gotten up and out of the bed. If other people are living at home, this mode will be desired as it will help reduce on-premise tracking alarms when people other than the patient are moving within the home.

Regardless of the mode selected, the caregiver will see the appropriate dementia patient monitoring mode display on for 5 seconds and then it will alternate with the display for the traditional security alarm message. Hence, if the burglary system were armed in Stay mode the display would alternate between the "Armed Stay" message and the "In-Bed Monitor Mode" message should this method of monitoring been selected. Or, we can have dedicated keypads for each portion of the system: one for patient monitoring and one for security system (as an option)

In summary, the displays that will be the final ones that the caregiver will see will be depicted as follows depending upon the specific mode that the caregiver desires.

In an alternative embodiment, the system will utilize external notification services in addition to or as an alternative to the local notification devices discussed above. For example, the system may be programmed such that the dialer 40 (or other like device) will dial a central station monitoring service if the patient has been determined to have left the premises, or even left certain predefined areas in the premises. This would then result in the central station to contact the caregiver, such as by telephone, cell phone, pager, email, IM, etc. The caregiver would then act on the alert and attend to the patient. The caregiver would also then respond to the central station with a predefined code or the like to inform it he or she has attended to the situation. A backup notification mode could also be provided in the event the caregiver either cannot be reached immediately or ha snot responded to the central station message in a certain amount of time (e.g. ten minutes). In this backup mode, a neighbor or other designated alternative caregiver (e.g. next of kin) would be notified in a similar manner by the central station.

It will be apparent to those skilled in the art that modifications to the specific embodiment described herein may be made while still being within the spirit and scope of the present invention.

What is claimed is:

1. A method of monitoring a patient located in a premises with a security system, comprising the steps of:

strategically locating a first plurality of motion detectors in a first area under surveillance in the premises comprising a plurality of walls, a floor, a door, and a bed, by locating a first motion detector on a first wall at approximately the same height as a top surface of the bed, locating a second motion detector approximately one foot above the floor along a side of the bed the patient normally leaves from, and locating a third motion detector near the door;

monitoring the first area under surveillance with the first plurality of motion detectors to ascertain if a patient has moved from an in-bed position by collecting signals from each of the first plurality of motion detectors and determining if the signals from each of the first plurality of motion detectors match a first predetermined pattern indicative of movement from the in-bed position, the first predetermined pattern comprising when the second motion detector is activated, the first motion detector is not activated for approximately five seconds after the second motion detector is activated, and the third motion detector is not activated, it is determined that the patient has moved from the in-bed position; and providing a notification if it is determined that the patient has moved from the in-bed position.

2. The method of claim 1 further comprising the step of ascertaining if a patient has left the first area under surveillance by determining if the signals from each of the first plurality of motion detectors match a second predetermined pattern indicative of leaving the first area under surveillance.

3. The method of claim 2 wherein the second predetermined pattern further comprises:

when the third motion detector is activated, it is determined that the patient has left the first area under surveillance.

4. The method of claim 3 further comprising the steps of ascertaining if the patient has returned to the bed by collecting signals from each of the first plurality of motion detectors; and determining if the signals from each of the first plurality of motion detectors match a third predetermined pattern indicative of movement to the in-bed position.

5. The method of claim 4 wherein the third predetermined pattern comprises:

when the third motion detector is activated and the first motion detector or the second motion detector is activated within approximately twenty seconds of the third motion detector being activated, it is determined that the patient is returning to the first area under surveillance.

6. The method of claim 5 wherein the third predetermined pattern further comprises:

when the second motion detector is activated and then deactivated, and the first motion detector is activated for approximately five seconds after the second motion detector is deactivated, and the third motion detector is not activated, it is determined that the patient has returned to the bed.

7. The method of claim 1 further comprising the step of monitoring a door sensor proximate the first area under surveillance to ascertain if the patient has left the first area under surveillance.

8. The method of claim 2 further comprising the step of providing a notification if it is ascertained that the patient has left the first area under surveillance.

9. The method of claim 8 wherein the step of providing a notification if it is determined that the patient left the first area under surveillance comprises providing the ascertained location of the patient.

10. The method of claim 8 wherein the step of providing a notification if it is determined that the patient left the first area under surveillance comprises displaying the ascertained location of the patient on a console.

11. The method of claim 2 further comprising the steps of:

monitoring a second area under surveillance in the premises with a second plurality of motion detectors strategically located therein, the second area of surveillance being proximate the first area under surveillance; and ascertaining a direction of movement by the patient by determining if the signals from each of the second plurality of motion detectors match a fourth predetermined pattern indicative of movement in the second area under surveillance.

12. The method of claim 11 comprising the step of selectively enabling and disabling a plurality of light fixtures strategically located throughout the premises in accordance with a predetermined lighting sequence.

13. The method of claim 11 wherein the second plurality of motion sensors are monitored only when it has been determined that the patient has left the first area under surveillance.

14. The method of claim 1 further comprising the steps of locating a bed sensor with respect to a bed in the first area under surveillance, and monitoring the bed sensor to ascertain if the patient has moved from the in-bed position.

15. The method of claim 1 wherein the step of providing a notification if it is determined that the patient has moved from the in-bed position comprises sounding an audible alarm.

16. The method of claim 1 wherein the step of providing a notification if it is determined that the patient has moved from the in-bed position comprises enunciating a spoken message via a strategically located speaker.

17. A system for monitoring a patient located in a premises, comprising a plurality of motion detectors strategically located in a first area under surveillance in the premises, comprising a first motion detector located on a first wall of a bedroom at approximately the same height as a top surface of a bed in the bedroom, a second motion detector located approximately one foot above the floor of the bedroom along a side of the bed a patient using the bed normally leaves from, and a third motion detector located near a door of the bedroom;

a control panel comprising processing logic adapted to analyze signals received from the plurality of motion detectors indicative of motion as detected by the motion detectors and ascertain if a patient has moved from an in-bed position, wherein the processing logic comprises a first predetermined pattern indicative of movement from the in-bed position comprising when the second motion detector is activated, the first motion detector is not activated for approximately five seconds after the second motion detector is activated, and the third motion detector is not activated, it is determined that the patient has moved from the in-bed position; and a notification device for providing a notification to a caregiver in the event that the processing logic determines that the patient has moved from the in-bed position.

18. The system of claim 17 wherein the processing logic is further adapted to ascertain if a patient has left the first area under surveillance by determining if the signals from each of the first plurality of motion detectors match a second predetermined pattern indicative of leaving the first area under surveillance.

19. The system of claim 18 wherein the second predetermined pattern further comprises:

when the third motion detector is activated, it is determined that the patient has left the first area under surveillance.

20. The system of claim 19 wherein the processing logic is further adapted to:

ascertain if the patient has returned to the bed by collecting signals from each of the first plurality of motion detectors; and determine if the signals from each of the first plurality of motion detectors match a third predetermined pattern indicative of movement to the in-bed position.

21. The system of claim 20 wherein the third predetermined pattern comprises:

when the third motion detector is activated and the first motion detector or the second motion detector is activated within approximately twenty seconds of the third motion detector being activated, it is determined that the patient is returning to the first area under surveillance.

22. The system of claim 21 wherein the third predetermined pattern further comprises:

when the second motion detector is activated and then deactivated, and the first motion detector is activated for approximately five seconds after the second motion detector is deactivated, and the third motion detector is not activated, it is determined that the patient has returned to the bed.

23. The system of claim 17 further comprising a door sensor located proximate the door and adapted to determine if the door has been opened or closed, wherein the processing logic is further adapted to monitor the door sensor to ascertain if the patient has left the first area under surveillance.

24. The system of claim 18, wherein the processing logic is further adapted to cause the notification device to provide a notification if it is ascertained by the processing logic that the patient has left the first area under surveillance.

25. The system of claim 24 wherein the notification device provides the ascertained location of the patient.

26. The system of claim 24 wherein the notification device is a console that displays the ascertained location of the patient.

27. The system of claim 18 further comprising a second plurality of motion detectors strategically located in a second area under surveillance in the premises; the second area of surveillance being proximate the first area under surveillance; and wherein the processing logic is further adapted to analyze signals received from the second plurality of motion detectors to ascertain a direction of movement by the patient by determining if the signals from each of the second plurality of motion detectors match a fourth predetermined pattern indicative of movement in the second area under surveillance.

28. The system of claim 27 further comprising a plurality of light fixtures strategically located throughout the premises, wherein the processing logic is further adapted to selectively enable and disable said plurality of light fixtures in accordance with a predetermined lighting sequence.

29. The system of claim 27 wherein the second plurality of motion sensors are monitored only when it has been determined that the patient has left the first area under surveillance.

30. The system of claim 17 further comprising a bed sensor located with respect to a bed in the first area under surveillance, and wherein the processing logic is further adapted to monitor the bed sensor to ascertain if the patient has moved from the in-bed position.

31. The system of claim 17 wherein the notification device is an audible alarm device.

32. The system of claim 17 wherein the notification device is a speaker for enunciating a spoken message.

* * * * *